United States Patent
Takeda et al.

(10) Patent No.: US 11,499,059 B2
(45) Date of Patent: Nov. 15, 2022

(54) ELECTRICAL STEEL SHEET

(71) Applicant: NIPPON STEEL CORPORATION, Tokyo (JP)

(72) Inventors: Kazutoshi Takeda, Tokyo (JP); Yoshiaki Natori, Tokyo (JP); Takuya Matsumoto, Tokyo (JP); Hiroyoshi Yashiki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 216 days.

(21) Appl. No.: 16/482,663

(22) PCT Filed: Mar. 23, 2018

(86) PCT No.: PCT/JP2018/011881
§ 371 (c)(1),
(2) Date: Jul. 31, 2019

(87) PCT Pub. No.: WO2018/174275
PCT Pub. Date: Sep. 27, 2018

(65) Prior Publication Data
US 2019/0367746 A1 Dec. 5, 2019

(30) Foreign Application Priority Data
Mar. 23, 2017 (JP) .............................. JP2017-057484

(51) Int. Cl.
| | | |
|---|---|---|
| *C09D 7/61* | (2018.01) | |
| *C09D 5/24* | (2006.01) | |
| *H01F 1/18* | (2006.01) | |
| *C09D 7/40* | (2018.01) | |
| *C09D 1/00* | (2006.01) | |

(52) U.S. Cl.
CPC ................ *C09D 5/24* (2013.01); *C09D 1/00* (2013.01); *C09D 7/61* (2018.01); *C09D 7/70* (2018.01); *H01F 1/18* (2013.01)

(58) Field of Classification Search
CPC ........ C08K 2201/016; C08K 2003/321; C09D 7/70; C09D 1/00; C09D 5/084; C09D 5/24; C09D 7/61
See application file for complete search history.

(56) References Cited

U.S. PATENT DOCUMENTS

| | | |
|---|---|---|
| 3,783,034 A | 1/1974 | Kitayama et al. |
| 2012/0088096 A1 | 4/2012 | Takeda et al. |
| 2013/0115444 A1 | 5/2013 | Sashi et al. |
| 2018/0320101 A1 | 11/2018 | Oshita et al. |

FOREIGN PATENT DOCUMENTS

| | | | |
|---|---|---|---|
| CN | 102459696 A | | 5/2012 |
| EP | 0 926 249 A1 | | 6/1999 |
| JP | 50-15013 | | 6/1975 |
| JP | 3-36284 A | | 2/1991 |
| JP | 6-330338 A | | 11/1994 |
| JP | 2000-129455 A | | 5/2000 |
| JP | 2002-69657 A | | 3/2002 |
| JP | 2003253462 A | * | 9/2003 |
| JP | 2007-77498 A | | 3/2007 |
| JP | 2011-246783 A | | 12/2011 |
| JP | 5830833 B2 | | 12/2015 |
| KR | 10-2013-0031914 A | | 3/2013 |
| WO | WO 2010/146821 A1 | | 12/2010 |
| WO | WO 2016/174924 A1 | | 11/2016 |

OTHER PUBLICATIONS

International Search Report for PCT/JP2018/011881 (PCT/ISA/210) dated May 22, 2018.
Office Action issued in TW Application No. 107110038 dated Oct. 15, 2018.
Written Opinion of the International Searching Authority for PCT/JP2018/011881 (PCT/ISA/237) dated May 22, 2018.
International Preliminary Report on Patentability and Written Opinion of the International Searching Authority (Forms PCT/IB/326, PCT/IB/373, and PCT/ISA/237) for International Application No. PCT/JP2018/011881, dated Oct. 3, 2019, with English translation of the Written Opinion.

* cited by examiner

*Primary Examiner* — Callie E Shosho
*Assistant Examiner* — Krupa Shukla
(74) *Attorney, Agent, or Firm* — Birch, Stewart, Kolasch & Birch, LLP

(57) ABSTRACT

An electrical steel sheet is described, which has an insulating coating on its surface. The insulating coating is free of chromium and comprises plate-like particles of inorganic compound and a metal phosphate. The plate-like particles of inorganic compound are in the form of secondary particles, which are formed by aggregating primary particles, and present in an amount of not less than 0.1 parts by mass and not greater than 20 parts by mass, with respect to 100 parts by mass of the metal phosphate. The secondary particles have an average particle diameter of no less than 0.05 μm and no greater than 5 μm, and have a specific surface area of 1 to 80 m²/g. The primary particles have an aspect ratio of 50 to 1000. The electrical steel sheet has excellent heat resistance, corrosion resistance, appearance, and insulating properties.

20 Claims, No Drawings

ELECTRICAL STEEL SHEET

FIELD

The present invention relates to an electrical steel sheet and a coating liquid for the electrical steel sheet.

BACKGROUND

In recent years, there has been a strong demand for higher efficiency and miniaturization of electrical devices in order to prevent global warming and from the viewpoint of global energy saving. Various measures are required to achieve the high efficiency and miniaturization of electrical devices, but electrical steel sheets used as motor iron cores or small transformer iron cores are also required to have improved magnetic properties and processability.

In general, the surface of these electrical steel sheets is coated with an insulating coating. Such an insulating coating is required to have coating characteristics such as corrosion resistance, weldability, adhesion, heat resistance, etc. in addition to the insulating property. In order to achieve a high efficiency and miniaturization of electrical devices, it is important to suppress heat generation (Joule heat) of the motor, and as a means for that purpose, measures to improve heat removal have been taken by increasing the efficiency of iron cores and winding wires and installing heat sink etc.

Even if an electrical steel sheet itself is improved in performance and efficiency, processing strain is introduced to the electrical steel sheet by processing the electrical steel sheet into a predetermined shape when manufacturing a motor or a transformer. Since the processing strain introduced degrades the magnetic characteristics, it is possible to further improve the efficiency of the electrical device by performing, after processing, so-called stress relief annealing by the customer.

On the other hand, the insulating coating applied to the surface of the electrical steel sheet is roughly classified into the following three types.

(1) An inorganic coating capable of being stress relief annealed at 750° C. where heat resistance is emphasized;

(2) An organic-inorganic mixed coating capable of being stress relief annealed, aiming to achieve both punchability and weldability; and (3) An organic coating where punchability is emphasized and the stress relief annealing is not possible.

Among the above-mentioned three types of insulating coatings, those widely used are insulating coatings containing the inorganic components of items (1) and (2) mentioned above which are capable of being stress relief annealed. At present, the organic-inorganic mixed coating of item (2) mentioned above has become mainstream because the balance of coating characteristics such as appearance, punchability, adhesion and the like is remarkably excellent as compared with the inorganic coating.

As a technique regarding the organic-inorganic mixed insulating coating for an electrical steel sheet as shown to item (2) mentioned above, there exists a technique which is disclosed by Patent Document 1 and Patent Document 2 as listed below, for example. Patent Document 1 as listed below discloses a method for forming an insulating coating using a treatment liquid containing as main components, a dichromate and an organic resin emulsion such as vinyl acetate, butadiene-styrene copolymer or acrylic resin. Further, Patent Document 2 as listed below, discloses a method for forming an insulating coating using a treatment liquid comprising a mixture of a chromic acid aqueous solution and an emulsion type resin and an organic reducing agent wherein the chromic acid aqueous solution contains a readily-soluble aluminum compound, a divalent metal oxide, etc. and $H_3BO_3$, and furthermore, wherein the molar ratio of $Me^{2+}/Al^{3+}$ in the chromic acid solution is from 0 to 7.0, and the molar ratio of $((Al^{3+})+(Me^{2+}))/CrO_3$ is from 0.2 to 0.5, and the molar ratio of $H_3BO_3/CrO_3$ is in the range of 0.1 to 1.5.

On the other hand, in recent years, development of an insulating coating which does not use a chromic acid aqueous solution containing hexavalent chromium has been promoted in response to a growing awareness of environmental problems. As such a technique, for example, Patent Document 3 as listed below describes a treating method for obtaining a coating using a treating liquid without a chromic compound, wherein the coating has coating properties equivalent to a conventional insulating coating containing a chromium compound and maintains an excellent slipperiness after stress relief annealing, wherein a phosphate of a specific composition, boric acid and/or colloidal silica, and an organic resin emulsion of a specific particle size are blended in a specific ratio and the resulting composition is baked onto a steel sheet.

Moreover, Patent document 4 as listed below, discloses a technique for manufacturing an electrical steel sheet, having an insulating coating thereon is excellent in coating characteristics is manufactured by blending, in a specific ratio, a metal phosphate with a resin emulsion which has specific ranges of a hydroxyl value and a particle diameter.

More recently, Patent Document 5 as listed below, discloses a technology relating to an electrical steel sheet having an insulating coating formed from a treatment liquid in which a metal phosphate and an organic resin emulsion having an absolute value of zeta potential of 30 mV or more are blended in a specific ratio.

Moreover, as a technique relating to an inorganic coating in item (1) as listed above, there exists techniques which are disclosed by Patent Document 6 and Patent Document 7 as listed below, for example. Patent Document 6 as listed below discloses a technique relating to an electrical steel sheet holding an insulating coating excellent in an insulation property, containing a specific amount of a metal phosphate and a silica or silicate filler having a specific particle size and a specific surface area. In addition, Patent Document 7 listed as below discloses a technology relating to an electrical steel sheet having an inorganic insulating coating, which is excellent in punchability and prevents deterioration of water resistance and corrosion resistance by containing a Zr compound, a B compound, and a Si compound in a specific ratio.

PRIOR ART LITERATURE

Patent Documents

Patent Document 1: Japanese Examined Patent Publication (Kokoku) No. 50-15013

Patent Document 2: Japanese Unexamined Patent Publication (Kokai) No. 03-36284

Patent Document 3: Japanese Unexamined Patent Publication (Kokai) No. 06-330338

Patent Document 4: Japanese Unexamined Patent Publication (Kokai) No. 2000-129455

Patent Document 5: Japanese Unexamined Patent Publication (Kokai) No. 2002-69657

Patent Document 6: International Publication (WO) No. 2010/146821

Patent Document 7: Japanese Unexamined Patent Publication (Kokai) No. 2011-246783

SUMMARY

Problems to be Solved by the Invention

Since the magnetic deterioration due to the process stress introduced at the time of processing became more problematic upon searching for high efficiency and miniaturization of the motor and the transformer as demonstrated above, a stress relief annealing has become more important. Recently, cases where the efficiency of stress relief annealing has been required have increased. That is, conventionally, stress relief annealing has been generally performed at an annealing temperature of about 750° C. and a soaking time of about 2 hours, but in recent years, there has been an increasing demand for increasing the annealing temperature to 800° C. or 850° C. and shortening its time in order to improve productivity. However, the electrical steel sheet having the organic-inorganic mixed type insulating coating, which has been mainstream until now, has a problem that the annealing temperature for stress relief cannot be increased, since the heat resistance of the steel sheet is not sufficient because it contains an organic resin.

In addition, there is a problem that inorganic insulating coatings that conventionally exist, cannot be adopted as an insulating coating for the following reasons. They contain chromate, and the insulating coatings of electrical steel sheets does not have sufficient punchability, corrosion resistance, appearance and heat resistance when the annealing temperature is high. In the case of the inorganic insulating coatings, there is a problem that the industrial cost is increased because their appearance is particularly easily deteriorated and uneven.

Accordingly, the present invention has been made in view of the above problems. The purpose of the present invention is to provide an electrical steel sheet which has more excellent heat resistance, corrosion resistance, adhesion and appearance without containing chromium, and exhibits excellent insulation properties even after stress relief annealing being performed at a higher temperature than ever before, and a coating liquid for the electrical steel sheet.

Means for Solving the Problems

The gist of the present invention is as follows.

(1) An electrical steel sheet on a surface of which an insulating coating is present, wherein the insulating coating is free of chromium and comprises plate-like particles of inorganic compound and a metal phosphate, and the content of the plate-like particles of inorganic compound is no less than 0.1 parts by mass and no greater than 20 parts by mass with respect to 100 parts by mass of the metal phosphate, and wherein the plate-like particles of inorganic compound are in the form of secondary particles, which are formed by aggregating primary particles, and the secondary particles have an average particle diameter of no less than 0.05 µm and no greater than 5 µm, and have a specific surface area of 1 to 80 $m^2/g$, and the primary particles have an aspect ratio of 50 to 1000.

(2) The electrical steel sheet according to item (1), wherein the metal phosphate is a salt of phosphoric acid with one or more metal elements selected from Al, Ba, Co, Fe, Mg, Mn, Ni and Zn.

(3) The electrical steel sheet according to item (1) or (2), wherein the plate-like inorganic compound is an oxide, a hydroxide, a carbonate or a sulfate.

(4) The electrical steel sheet according to any one of items (1) to (3), wherein the plate-like inorganic compound is alumina, gibbsite, silica, talc, kaolin, smectite or mica.

(5) The electrical steel sheet according to any one of items (1) to (4), wherein it is a non-oriented electrical steel sheet.

(6) A coating liquid for an electrical steel sheet, wherein the coating liquid is free of chromium and comprises a solution of plate-like particles of inorganic compound and a metal phosphate, and the content of the plate-like particles of inorganic compound is no less than 0.1 parts by mass and no greater than 20 parts by mass with respect to 100 parts by mass of the metal phosphate, and wherein the plate-like particles of inorganic compound are in the form of secondary particles, which are formed by aggregating primary particles, and the secondary particles have an average particle diameter of no less than 0.05 µm and no greater than 5 µm, and have a specific surface area of 1 to 80 $m^2/g$, and the primary particles have an aspect ratio of 50 to 1000.

(7) The coating liquid according to item (6), wherein the metal phosphate is a salt of phosphoric acid with one or more metal elements selected from Al, Ba, Co, Fe, Mg, Mn, Ni and Zn.

(8) The coating liquid according to item (6) or (7), wherein the plate-like inorganic compound is an oxide, a hydroxide, a carbonate or a sulfate.

(9) The coating liquid according to any one of items (6) to (8), wherein the plate-like inorganic compound is alumina, gibbsite, silica, talc, kaolin, smectite or mica.

(10) The coating liquid according to any one of items (6) to (9), wherein the electrical steel sheet is a non-oriented electrical steel sheet.

Effect of the Invention

As described above, according to the present invention, it is possible to provide an electrical steel sheet that has more excellent heat resistance, corrosion resistance, adhesion and appearance without containing chromium, and exhibits excellent insulation properties even after performing stress relief annealing at a higher temperature than ever before.

MODE FOR CARRYING OUT THE INVENTION

Hereinafter, preferred embodiments of the present invention will be described in detail.

The embodiments of the present invention described in detail below are described with respect to an electrical steel sheet used as an iron core material of an electric device and a coating liquid for the electrical steel sheet. In particular, an electrical steel sheet having a chromium-free insulation coating, which has a good heat resistance and has properties equal to or higher than those of an organic resin-containing insulation coating, and a coating solution for the electrical steel plate, will be described in detail.

<About Electrical Steel Sheet on which Insulating Coating is Formed>

First, an electrical steel sheet on which an insulating coating according to an embodiment of the present invention is formed will be described.

The electrical steel sheet (which may be a non-oriented electrical steel sheet) used in the present embodiment is not particularly limited, but it is preferable to use an electrical steel sheet containing Si: 0.1% by mass or more, Al: 0.05% by mass or more and the balance being Fe and impurities. Si is an element that improves the magnetic properties by increasing electrical resistance as the content thereof increases, but at the same time the brittleness increases as the electrical resistance increases. Therefore, the content of Si is preferably less than 4.0%. Similarly, Al is also an element that improves magnetic properties by containing Al, but the rollability is lowered with the improvement of the magnetic properties. Therefore, the content of Al is preferably less than 3.0%.

In addition to the above Si and Al, the electrical steel sheet used in the present embodiment may contain Mn in the range of 0.01% by mass to 3.0% by mass in place of a part of the remaining Fe. In addition, in the electrical steel sheet used in the present embodiment, the total content of other typical elements such as S, N, and C is preferably less than 100 ppm, and more preferably less than 30 ppm.

Furthermore, the electrical steel sheet used in the present embodiment may be an oriented electrical steel sheet or may be a non-oriented electrical steel sheet. Non-oriented electrical steel sheets are often used for moving parts such as motors, and in addition to heat resistance and corrosion resistance, etc., adhesion is required. The insulating coating of the electrical steel sheet according to this embodiment has all these properties. Needless to say, the insulating coating of the electrical steel sheet according to the present embodiment is also applicable to an oriented electrical steel sheet that is often used for non-moving parts such as transformers.

In this embodiment, a steel ingot (e.g., slab) having the above-mentioned steel components is coiled as a hot-rolled sheet by hot rolling, and optionally annealed in the state of hot-rolled sheet in the range of 800° C. to 1050° C. After that, it is preferable to cold-roll the sheet to a thickness of 0.15 mm to 0.5 mm and further to anneal and use it as an electrical steel sheet. More preferably, the thickness of the electrical steel sheet used in the present embodiment is 0.25 mm or less. Further, at the time of annealing after cold rolling, the annealing temperature is preferably in the range of 750° C. to 1000° C.

Furthermore, in the case of the electrical steel sheet used in the present embodiment, it is preferable that its surface roughness be relatively small, because its magnetic characteristics become better. Specifically, each of the center line average roughnesses (Ra) in the rolling direction (L direction) and in the direction (C direction) perpendicular to the rolling direction is preferably 1.0 μm or less, preferably no less than 0.1 μm and no greater than 0.5 μm. This is because, when the center line average roughness Ra exceeds 1.0 μm, the magnetic characteristics tend to deteriorate.

<About Insulating Coating>

On the surface of the above-described electrical steel sheet (which may be a non-oriented electrical steel sheet), an insulating coating containing no chromium as described in detail below is formed as an insulating coating. The insulating coating formed on the surface of the electrical steel sheet according to the present embodiment is an insulating coating comprising, as main components, a metal phosphate and inorganic compound fine particles having a specific shape, and being free of chromium. By being free of chromium, the environmental load is small. Further, the insulating coating according to the present embodiment may not contain zirconium (Zr). Zirconium is one of relatively expensive raw materials, and the absence of zirconium can reduce the cost of the insulating coating. Hereinafter, such an insulating coating will be described in detail.

[Metal Phosphate]

The metal phosphate contained in the insulating coating according to the present embodiment becomes a solid content when a solution (for example, an aqueous solution or the like) containing phosphoric acid and metal ions as main components is dried. The type of phosphoric acid is not particularly limited, and various known phosphoric acids can be used. For example, orthophosphoric acid, metaphosphoric acid, polyphosphoric acid and the like are preferably used.

Further, the type of the above metal ion is not particularly limited, but one or more selected from the group consisting of Al, Ba, Co, Fe, Mg, Mn, Ni and Zn may preferably be used. In particular, it is more preferable to use at least one of Al and Zn.

Here, when preparing a metal phosphate solution, at least any one of oxides, carbonates, and hydroxides of metal ions is mixed with various phosphoric acids such as orthophosphoric acid (which may be a solution, particularly an aqueous solution).

[Plate-Like Particles of Inorganic Compound]

Inorganic compound fine particles with a plate shape (hereinafter, also referred to as "plate-like particles of inorganic compound") are contained in the insulating coating according to the present embodiment as one of the main components.

The plate-like particles of inorganic compound according to the present embodiment is in the form of secondary particles, formed by aggregating primary particles, and the secondary particles have an average particle diameter of no less than 0.05 μm and no greater than 5 μm. In addition, in the plate-like particles of inorganic compound according to the present embodiment, the secondary particles have a specific surface area in the range of 1 to 80 $m^2/g$, which is described in detail below. Furthermore, in the plate-like particles of inorganic compound according to the present embodiment, the primary particles have an aspect ratio in the range of 50 to 1000, which is described in detail below. In the present embodiment, the primary particles which satisfies the above aspect ratio have a plate-like, leaf-like, or scale-like shape, and the primary particles aggregate to form the secondary particles. In the secondary particles, the primary particles randomly overlap with each other to form a space in the secondary particles. At least a part of the space may be a space that opens to the surface of the secondary particle, or may be a closed space. The secondary particles having such a complicated morphology are defined by satisfying the above-mentioned average particle diameter and the specific surface area, and satisfying the above-mentioned range of aspect ratio of the primary particles.

As a component of the plate-like particles of inorganic compound as described above, for example, at least one of an oxide, a hydroxide, a carbonate and a sulfate is preferable, and a chloride, a nitrate, a nitride or a bromide is less preferable. Among such inorganic compounds, the oxide may specifically include alumina, talc, kaolin, silica and the like, the hydroxide may include gibbsite and the like, and the mineral substance may include smectite and mica.

Here, when the average particle diameter of the secondary particles of the plate-like particles of inorganic compound is less than 0.05 μm, the coating property is deteriorated, which is not preferable. On the other hand, when the average particle diameter of the secondary particles of the plate-like particles of inorganic compound exceeds 5 μm, the space factor decreases, which is not preferable.

The average particle diameter of the plate-like particles of inorganic compound as described above can be measured by a known method, but in the secondary particles of the plate-like particles of inorganic compound according to the present embodiment, the average particle diameter means a particle diameter at 50% integrated value in the particle size distribution determined by a laser diffraction or scattering method.

The above-mentioned specific surface area is measured by a gas adsorption method and conforms to JIS-K6217. If the specific surface area of the secondary particles of the plate-like particles of inorganic compound is less than 1.0 $m^2/g$, it becomes harder or takes more time to mix them in a treatment liquid (coating liquid), since the secondary particles easily settle or float in the liquid. If the specific surface area is more than 80.0 $m^2/g$, the secondary particles in the treatment liquid (coating liquid) tend to aggregate during dry baking to form coating defects. Therefore, in the present embodiment, the average specific surface area is in the range of 1.0 to 80.0 $m^2/g$.

In addition, the above aspect ratio means the ratio of the diameter to the thickness (diameter/thickness) of the primary particle of the plate-like particle of inorganic compound. Further, the diameter of the primary particle of the plate-like particle of inorganic compound is a diameter at the primary particle surface (projection plane) having the largest projected area when the primary particle is projected from all directions. The thickness for defining the aspect ratio is the thickness of the primary particle in the direction perpendicular to the projection plane giving the diameter. In any case, an outer shape of the plate-like particle of inorganic compound of interest is regarded as a circle, and the ratio of the diameter to the thickness of the circle (more specifically, the value given by (diameter/thickness)) is the aspect ratio.

Here, the diameter and thickness used to define the aspect ratio can be measured by a known measurement method. In the present embodiment, the aspect ratio is obtained by observing the particle with a scanning electron microscope (SEM), and analyzing by an analysis method defined in JIS Z 8827-1 "Particle diameter analysis-image analysis method-part 1: static image analysis method". Unless otherwise noted, the aspect ratio in the present specification is obtained by observing a SEM image taken at approximately 5000 times using JSM-7000F manufactured by JEOL Ltd. The aspect ratio is an average of aspect ratios of at least 10 particles. Incidentally, the aspect ratio of the primary particles is measured through observation of SEM images of secondary particles. The primary particles are aggregated to form secondary particles, and the primary particles constituting the secondary particles can be precisely observed by enlargement and angle adjustment of the secondary particle image, and thus the aspect ratio of the primary particles can be calculated. Also, the aspect ratio of the primary particles measured by this method is considered to be representative of the aspect ratio of the primary particles in an actual insulating coating.

Incidentally, when the above aspect ratio is less than 50, the solution becomes unstable and appearance defects are likely to occur, which is not preferable. On the other hand, when the above-mentioned aspect ratio exceeds 1000, unevenness is miniaturization likely to occur in the formed insulating coating, leading to deteriorate adhesion, which is not preferable. Such an aspect ratio is preferably in the range of 100 to 500.

So far, the reasons for numerical limitation of the three items of average particle diameter and specific surface area of the secondary particles of the plate-like particles of inorganic compound, and aspect ratio of the primary particles have been described. The plate-like particles of inorganic compound according to the embodiment of the present invention simultaneously satisfy all of these items. While not wishing to be bound by a particular theory, the following may be considered. The secondary particles in which the primary particles with the above aspect ratio are aggregated, form a complex morphology satisfying the average particle diameter and the specific surface area as described above. By forming an appropriate space due to the complex morphology, the insulation and heat resistance of the insulating coating are improved. Further, in the space portion, a metal phosphate easily intrudes, and further, due to its anchor effect, corrosion resistance and adhesion are improved, which contributes to the improvement of the appearance.

In the insulating coating according to the present embodiment, the content of the plate-like particles of inorganic compound is no less than 0.1 parts by mass and no greater than 20 parts by mass, with respect to 100 parts by mass of the metal phosphate. When the content of the plate-like particles of inorganic compound is less than 0.1 parts by mass, even if the plate-like inorganic compounds are contained, the effect of their inclusion is not sufficiently exhibited, which is not preferable. On the other hand, when the content of the plate-like particles of inorganic compound is greater than 20 parts by mass, the coating forming property is deteriorated, and the adhesion after stress relief annealing may be deteriorated, which is not preferable. The content of the plate-like particles of inorganic compound is preferably no less than 0.5 parts by mass and no greater than 10 parts by mass, with respect to 100 parts by mass of the metal phosphate.

In the electrical steel sheet according to the present embodiment, it becomes possible to improve a heat resistance of the insulating coating of the electrical steel sheet by forming an insulating coating comprising the metal phosphate of the specific composition and the specific inorganic compound fine particles as described above at a specific ratio on the surface of the steel sheet. Although the details of the reason why the heat resistance is improved by forming the insulating coating having the components as described above are unknown, it is expected that the heat resistance is improved by combining the specific metal phosphate around the inorganic compound fine particles. Further, since the secondary particles of the inorganic compound particles have a complex morphology, they act as an anchor of the metal phosphate, by which the corrosion resistance and the adhesion are improved, and thus an excellent appearance can be obtained. By forming such an insulating coating on the surface of the electrical steel sheet, stress relief annealing can be performed at a higher temperature than before, that is, it has heat resistance. Furthermore, it is possible to realize excellent insulation properties even after stress relief annealing.

[Deposition Amount of Insulating Coating]

In the electrical steel sheet according to the present embodiment, the deposition amount of the insulating coating (inorganic insulating coating) as described above is not particularly limited, but, for example, it is preferable to be within the range of no less than 0.5 $g/m^2$ and no greater than 2.5 $g/m^2$. When the deposition amount of the insulating coating is less than 0.5 $g/m^2$, the interlayer resistance and the like are likely to be deteriorated, which may make it difficult to maintain the insulating property. On the other hand, when the deposition amount of the insulating coating exceeds 2.5 $g/m^2$, the tendency for the adhesion to deteriorate may be remarkable. The deposition amount of the insulating coating is more preferably no less than 0.5 $g/m^2$ and no greater than 1.0 $g/m^2$.

Here, the solid content in the treatment liquid (coating liquid) used for the formation of the insulating coating is substantially equal to the deposition amount of the insulating coating as described above, and the ratio of the metal phosphate to the plate-like particles of inorganic compound in the treatment liquid (coating liquid) used for the formation of the insulating coating is substantially equal to the ratio of the content of the metal phosphate to the plate-like particle of inorganic compound in the insulating coating as described above. Incidentally, when measuring the deposition amount of the insulation coating after deposition, it is possible to utilize various well-known measuring methods, for example, a method of measuring a weight difference before and after sodium hydroxide aqueous solution soaking, and a fluorescent X-ray method using a calibration curve method etc. may suitably be utilized. Similarly, when the content of plate-like particles of inorganic compound is to be measured subsequently, various known measurement methods, for example, a fluorescent X-ray method using a calibration curve method or the like may be suitably utilized.

[Method of Forming Insulating Coating]

In the present embodiment, a treatment liquid (coating liquid) containing the above components is prepared, and the treatment liquid (coating liquid) is applied to the surface of an electrical steel sheet (which may be a non-oriented electrical steel sheet) and dried. As a result, it is possible to form an insulating coating as described above. As an embodiment of the present invention, it is possible to provide a coating liquid for an electrical steel sheet containing the above-mentioned components in the above-mentioned content. The above-mentioned insulating coating is obtained by this coating liquid.

The treatment liquid (coating liquid) is prepared by adding the above-mentioned metal phosphate aqueous solution to a dispersion in which the above plate-like particles of inorganic compound are preliminarily added and dispersed in various solutions.

As plate-like particles of inorganic compound, those obtained by preliminarily adding and dispersing plate-like particles of inorganic compound in various solvents can be used. As a dispersion solvent, besides pure water, an organic solvent such as dioxane or ethanol may suitably be used.

Here, the solid content (plate-like inorganic compound and metal phosphate) in the treatment liquid (coating liquid) is substantially equal to the deposition amount of the insulating coating, and therefore the ratio of the content of the metal phosphate and that of the plate-like particles of inorganic compound in the treatment liquid (coating liquid) is adjusted such that it becomes substantially equal to the ratio of the content of the metal phosphate and that of the plate-like particles of inorganic compound in the insulating coating.

Incidentally, when the above described treatment liquid (coating liquid) is applied to the electrical steel plate surface, a coating method is not specifically limited. It is possible to suitably utilize a known coating method. When the treatment liquid (coating liquid) is applied, for example, a roll coater method may be used, or a coating method such as a spray method or dip method may be used.

Moreover, the heating method at the time of heating and drying the coated treatment liquid (coating liquid) is not specifically limited. It is possible to suitably utilize a known heating method. As a heating method, for example, a method using a normal radiation furnace may be used, or a heating method using electricity such as an induction heating method may be used. From the viewpoint of control accuracy of heating rate, an induction heating method is more preferably used. An insulating coating can be formed by maintaining a temperature equal to or higher than the boiling point of the solvent of the treatment liquid (coating liquid) for a predetermined period of time by utilizing these heating methods.

Incidentally, in the above-mentioned treatment liquid (coating liquid), an additive such as a surfactant may be further contained. As such a surfactant, for example, a nonionic surfactant is preferably used. In addition, in the above-mentioned treatment liquid (coating liquid), a brightener or the like may be contained.

Hereinabove, the insulating coating on the electrical steel sheet according to the present embodiment has been described in detail.

As explained above, the electrical steel sheet according to the present embodiment is obtained by forming an insulating coating on a surface of an electrical steel sheet, the insulating coating composed of a metal phosphate of a specific composition and a specific inorganic compound fine particle at a specific ratio, in order to improve a heat resistance, corrosion resistance and adhesion of the insulating coating on the electrical steel sheet, and the resulting electrical steel sheet retains the insulation characteristics and excellent appearance after stress relief annealing at a temperature higher than ever before. Moreover, as an embodiment of this invention, the coating liquid for electrical steel plates which can form the insulation coating of said electrical steel plate can also be provided.

Example

Subsequently, the electrical steel sheet according to the present invention will be specifically described with reference to examples. Among the examples shown below, those corresponding to the present invention examples are merely examples of the electrical steel sheet according to the present invention, and the electrical steel sheet according to the present invention is not limited to the following examples.

Various plate-like inorganic fine particle compounds shown in Table 1 below are prepared, and these plate-like particles of inorganic compound are incorporated in the metal phosphate solution shown in Table 2 in the contents shown in Table 1. For concentration adjustment, a pure water was added as needed and stirred to form a treatment liquid (coating liquid) for forming an insulating coating.

The treatment liquid comprised of Si: 3.1%, Al: 0.6%, Mn: 0.1%, on the basis of % by mass, and the balance being Fe and impurities. It was applied to the surface of a non-oriented electrical steel sheet, which had a sheet thickness of 0.30 mm, and a surface roughness Ra (centerline average roughness) of 0.28 μm for each of L direction and C direction. The treatment liquid was coated in an amount of 1.2 g/m$^2$ with a roll coater and baked at the sheet temperature of 350° C. in 500° C. heating furnace for 60 seconds to form an insulation coating.

Incidentally, as the plate-like particles of inorganic compound shown in Table 1 below, ones prepared by preliminarily adding and dispersing plate-like particles of inorganic compound in various solvents were used. As the solvent, besides pure water, an organic solvent such as dioxane or ethanol was appropriately used. After that, the metal phosphate aqueous solutions as described below were added to a dispersion of 10 parts by mass of plate-like particles of inorganic compound dispersed in 100 parts by mass of water and solvent. As a result, the treatment liquid (coating liquid) was prepared such that the inorganic compound had a predetermined mass part in the table with respect to 100 parts by mass of metal phosphate, on the basis of the solid content in the coating. In some cases, dispersants such as surfactants were also used appropriately.

In addition, in Table 2 below, for each of the metal phosphates, commercially available aqueous phosphate solutions were used, and pure water was added to adjust the ratio of the solid content to be 30% by mass, and each of metal phosphates was mixed such that the ratio of each of metal elements in the metal phosphates was adjusted. Incidentally, in the production of the metal phosphate shown in Table 2, orthophosphoric acid was used as phosphoric acid.

Here, for each of the inorganic compounds shown in Table 1 below, commercially available compounds having an aspect ratio, a specific surface area and an average particle diameter (D50) as shown below were used. Incidentally, for each compound shown in Table 1, the average particle diameter (D50) and the specific surface area are those of secondary particles, respectively, which are catalog values, and the aspect ratios are those of primary particles, which is the value computed from the actual measurement value by scanning electron microscope observation of each of compounds.

Moreover, in the treatment liquids (coating liquids) of Table 2 below, the following commercially available compounds were utilized as each metal source of metal phosphates. Moreover, also for chromate Mg, a commercially available compound was utilized.

Al:Al(OH)$_3$
Ba:Ba(OH)$_2$
Co:CoCO$_3$
Fe:Fe$_3$O$_4$
Mg:Mg(OH)$_2$
Mn:MnO
Ni:Ni(OH)$_2$
Zn:ZnO
Ca:CaO
K:KOH

TABLE 1

| No. | Type of inorganic compound | Aspect ratio (diameter/thickness) | Specific surface area (m$^2$/g) | Average diameter (D50, μm) |
|---|---|---|---|---|
| 1 | Silica 1 | 70 | 70 | 0.08 |
| 2 | Silica 2 | 240 | 52 | 0.4 |
| 3 | Silica 3 | 950 | 27 | 0.9 |
| 4 | Kaolin 1 | 300 | 24 | 1.2 |
| 5 | Gibbsite 1 | 90 | 24 | 2.5 |
| 6 | Smectite 1 | 150 | 67 | 0.14 |
| 7 | Talc 1 | 700 | 14.3 | 3.6 |
| 8 | Mica | 500 | 18 | 4.8 |
| 9 | Alumina | 100 | 13.4 | 2.2 |
| 10 | Silica 4 | 1.6 | 78 | 0.5 |
| 11 | Silica 5 | 1400 | 13 | 2.6 |
| 12 | Kaolin 2 | 230 | 86 | 0.02 |
| 13 | Smectite 2 | 160 | 1.1 | 6.7 |
| 14 | Talc 2 | 20 | 46 | 8.1 |
| 15 | Titanium oxide | 1.3 | 5.6 | 3.4 |
| 16 | Gibbsite 2 | 60 | 0.5 | 1.6 |
| 17 | Kaolin 3 | 340 | 88 | 3.8 |

TABLE 2

| No. | Phosphate 100 parts by mass Type:Ratio(mass %) | Inorganic compound Type | Ratio(parts by mass) | Others |
|---|---|---|---|---|
| 1 | Al:70 + Zn:30 | 1 | 10.0 | |
| 2 | Al:100 | 2 | 5.0 | |
| 3 | Al:60 + Mg:40 | 3 | 1.0 | |
| 4 | Al:70 + Ni:30 | 4 | 3.0 | |
| 5 | Al:30 + Zn:70 | 5 | 18.0 | |
| 6 | Al:70 + Co:30 | 6 | 15.0 | |
| 7 | Al:70 + Mn:30 | 7 | 8.0 | |
| 8 | Al:85 + Fe:15 | 8 | 0.3 | |
| 9 | Al:95 + Ba:5 | 9 | 10.0 | |
| 10 | Mg:70 + Ni:30 | 4 | 3.0 | |
| 11 | Mg:50 + Zn:50 | 5 | 5.0 | |
| 12 | Al:70 + Li:30 | 3 | 3.0 | |
| 13 | Al:100 | 10 | 5.0 | |
| 14 | Al:60 + Mg:40 | 11 | 1.0 | |
| 15 | Al:60 + Mg:40 | 12 | 8.0 | |
| 16 | Al:100 | 13 | 0.5 | |
| 17 | Al:60 + Mg:40 | 14 | 3.0 | |
| 18 | Al:70 + Co:30 | 2 | 0.05 | |
| 19 | Al:70 + Mn:30 | 3 | 23.0 | |
| 20 | Al:100 | 15 | 3.0 | |
| 21 | Al:100 | 16 | 3.0 | |
| 22 | Al:100 | 17 | 3.0 | |
| 23 | Al:100 | — | — | Organic compound added |
| 24 | ChromateMg | — | — | Organic compound added |

The insulating coatings obtained as described above were evaluated by the following method, and the obtained results were shown in Table 3 below.

<Insulating Property>

The insulating property was evaluated based on the interlayer resistance measured according to JIS method (JIS C2550).

4: no less than 30 Ω·cm$^2$/sheet
3: no less than 10 Ω·cm$^2$/sheet and less than 30 Ω·cm$^2$/sheet
2: no less than 3 Ω·cm$^2$/sheet and less than 10 Ω·cm$^2$/sheet
1: less than 3 Ω·cm$^2$/sheet The result of rating 3 or higher means "pass."

<Corrosion Resistance>

A test for corrosion resistance was conducted in accordance with JIS method: the salt water spray test (JIS Z2371) and the samples after aging for 4 hours were evaluated using 10 scores. The evaluation criteria are as follows, and a score of 6 or more was evaluated as "pass."

10: There was no rust
9: Rust generation amount was extremely small (area ratio 0.1% or less)
8: Rust generation area ratio=greater than 0.1% and no greater than 0.25%
7: Rust generation area ratio=greater than 0.25% and no greater than 0.50%
6: Rust generation area ratio=greater than 0.50% and no greater than 1%
5: Rust generation area ratio=greater than 1% and no greater than 2.5%
4: Rust generation area ratio=greater than 2.5% and no greater than 5%
3: Rust generation area ratio=greater than 5% and no greater than 10%
2: Rust generation area ratio=greater than 10% and no greater than 25%
1: Rust generation area ratio=greater than 25% and no greater than 50%

<Heat Resistance>

The heat resistance was evaluated by the corrosion resistance after stress relief annealing. Heat treatment was carried out in a 100% nitrogen atmosphere at 850° C. for 1 hour, and then aging was carried out for 48 hours in a constant temperature and humidity chamber with a temperature of 50° C. and a humidity of 90%. Then, rust generation area ratio was evaluated as in the case of corrosion resistance. The evaluation criteria are as follows, and a score of 6 or more was evaluated as "pass."
10: There was no rust
9: Rust generation amount was extremely small (area ratio 0.1% or less)
8: Rust generation area ratio=greater than 0.1% and no greater than 0.25%
7: Rust generation area ratio=greater than 0.25% and no greater than 0.50%
6: Rust generation area ratio=greater than 0.50% and no greater than 1%
5: Rust generation area ratio=greater than 1% and no greater than 2.5%
4: Rust generation area ratio=greater than 2.5% and no greater than 5%
3: Rust generation area ratio=greater than 5% and no greater than 10%
2: Rust generation area ratio=greater than 10% and no greater than 25%
1: Rust generation area ratio=greater than 25% and no greater than 50%
<Adhesion>

The adhesion was evaluated by a sliding test after stress relief annealing. 45 C filter paper was wound around a 20 mmϕ cylinder, a load of 100 gf (1 gf is $9.8 \times 10^{-3}$ N) was applied thereto and the surface of the insulation coating was rubbed by reciprocating the filter paper five times. Then, the amount of the coating residue adhered to the filter paper was measured. The evaluation criteria are as follows, and a score of 3 or more was evaluated as "pass."
5: No residue
4: Very slight residue appears linearly.
3: A clear residue adheres.
2: The residue has a band-like width.
1: Powdery residue adheres to filter paper.
<Appearance>

The appearance of the insulation coating was subjected to visual inspection of the obtained non-oriented electrical steel sheet with insulation coating by a trained inspector. The evaluation criteria are as follows:
5: Glossy, smooth and uniform
4: Glossy but slightly inferior in uniformity
3: Slightly glossy and smooth but inferior in uniformity
2: Less glossy, slightly inferior in smoothness and inferior in uniformity
1: Poor in gloss, uniformity, and smoothness
and a score of 4 or more was evaluated as "pass."

TABLE 3

| No. | Insulation | Corrosion resistance | Adhesion | Appearance | Heat resistance | Note |
|---|---|---|---|---|---|---|
| 1 | 4 | 10 | 4 | 5 | 9 | Inv. Ex . . . |
| 2 | 4 | 9 | 4 | 5 | 9 | Inv. Ex . . . |
| 3 | 4 | 7 | 5 | 4 | 9 | Inv. Ex . . . |
| 4 | 4 | 9 | 5 | 4 | 8 | Inv. Ex . . . |
| 5 | 4 | 10 | 4 | 5 | 8 | Inv. Ex . . . |
| 6 | 3 | 10 | 4 | 4 | 8 | Inv. Ex . . . |
| 7 | 4 | 9 | 4 | 5 | 9 | Inv. Ex . . . |
| 8 | 3 | 7 | 5 | 4 | 8 | Inv. Ex . . . |
| 9 | 4 | 8 | 4 | 4 | 9 | Inv. Ex . . . |
| 10 | 4 | 8 | 5 | 4 | 8 | Inv. Ex . . . |
| 11 | 4 | 8 | 4 | 5 | 8 | Inv. Ex . . . |
| 12 | 3 | 6 | 3 | 4 | 6 | Inv. Ex . . . |
| 13 | 2 | 7 | 5 | 4 | 6 | Comp. Ex. |
| 14 | 3 | 4 | 3 | 4 | 2 | Comp. Ex. |
| 15 | 2 | 7 | 4 | 4 | 5 | Comp. Ex. |
| 16 | 3 | 4 | 2 | 3 | 6 | Comp. Ex. |
| 17 | 4 | 3 | 1 | 2 | 4 | Comp. Ex. |
| 18 | 3 | 8 | 3 | 4 | 2 | Comp. Ex. |
| 19 | 3 | 4 | 2 | 2 | 6 | Comp. Ex. |
| 20 | 2 | 7 | 5 | 2 | 8 | Comp. Ex. |
| 21 | 2 | 5 | 2 | 4 | 6 | Comp. Ex. |
| 22 | 4 | 7 | 2 | 2 | 6 | Comp. Ex. |
| 23 | 4 | 7 | 1 | 5 | 2 | Comp. Ex. |
| 24 | 3 | 8 | 2 | 5 | 4 | Comp. Ex. |

As is apparent from Table 3 above, an electrical steel sheet according to the present invention, on a surface of which an insulating coating is present, wherein the insulating coating is free of chromium and comprises plate-like particles of inorganic compound and a metal phosphate, and the content of the plate-like particles of inorganic compound is from 0.1 parts by mass to 20 parts by mass with respect to 100 parts by mass of the metal phosphate, and wherein the plate-like particles of inorganic compound are in the form of secondary particles, which are formed by aggregating primary particles, and the secondary particles have an average particle diameter of no less than 0.05 μm and no greater than 5 μm, and have a specific surface area of 1 to 80 m²/g, and the primary particles have an aspect ratio of 50 to 1000, is excellent in insulation, corrosion resistance, adhesion, appearance as compared with the comparative examples, and further has a remarkable improvement effect in heat resistance which bears stress relief annealing at a high temperature.

Although preferred embodiments of the present invention have been described above in detail, the present invention is not limited to such examples. It is obvious that those skilled in the art to which the present invention pertains can conceive of various changes or modifications within the scope of the technical idea described in the claims. Of course, it is understood that these changes or modifications also fall within the technical scope of the present invention.

The invention claimed is:

1. An electrical steel sheet, comprising:
    an insulating coating on a surface thereof,
    wherein the insulating coating is free of chromium and comprises plate-like particles of an inorganic compound and a metal phosphate, and a content of the plate-like particles of the inorganic compound is no less than 0.1 parts by mass and no greater than 20 parts by mass with respect to 100 parts by mass of the metal phosphate, and
    wherein the plate-like particles of the inorganic compound are in the form of secondary particles, wherein said secondary particles comprise aggregated primary particles, and
    wherein the secondary particles have an average particle diameter of no less than 0.05 and no greater than 5 μm, and have a specific surface area of 1 to 80 m²/g, and the primary particles have an aspect ratio of 50 to 1000, and wherein in the secondary particles, the primary particles randomly overlap with each other to form a space in the secondary particles.

2. The electrical steel sheet according to claim 1, wherein the metal phosphate is a salt of phosphoric acid with one or more metal elements selected from Al, Ba, Co, Fe, Mg, Mn, Ni and Zn.

3. The electrical steel sheet according to claim 2, wherein the plate-like particles of the inorganic compound are an oxide, a hydroxide, a carbonate or a sulfate.

4. The electrical steel sheet according to claim 2, wherein the plate-like particles of the inorganic compound are alumina, gibbsite, silica, talc, kaolin, smectite or mica.

5. The electrical steel sheet according to claim 2, wherein the electrical steel sheet is a non-oriented electrical steel sheet.

6. The electrical steel sheet according to claim 1, wherein the plate-like particles of the inorganic compound are an oxide, a hydroxide, a carbonate or a sulfate.

7. The electrical steel sheet according to claim 6, wherein the plate-like particles of the inorganic compound are alumina, gibbsite, silica, talc, kaolin, smectite or mica.

8. The electrical steel sheet according to claim 6, wherein the electrical steel sheet is a non-oriented electrical steel sheet.

9. The electrical steel sheet according to claim 1, wherein the plate-like particles of the inorganic compound are alumina, gibbsite, silica, talc, kaolin, smectite or mica.

10. The electrical steel sheet according to claim 9, wherein the electrical steel sheet is a non-oriented electrical steel sheet.

11. The electrical steel sheet according to claim 1, wherein the electrical steel sheet is a non-oriented electrical steel sheet.

12. A coating liquid for an electrical steel sheet, wherein the coating liquid is free of chromium, the coating liquid comprising:
a solution of plate-like particles of an inorganic compound and a metal phosphate,
wherein a content of the plate-like particles of the inorganic compound is no less than 0.1 parts by mass and no greater than 20 parts by mass with respect to 100 parts by mass of the metal phosphate, and
wherein the plate-like particles of the inorganic compound are in the form of secondary particles, wherein said secondary particles comprise aggregated primary particles, and
wherein the secondary particles have an average particle diameter of no less than 0.05 µm and no greater than 5 µm, and have a specific surface area of 1 to 80 $m^2/g$, and the primary particles have an aspect ratio of 50 to 1000.

13. The coating liquid according to claim 12, wherein the metal phosphate is a salt of phosphoric acid with one or more metal elements selected from Al, Ba, Co, Fe, Mg, Mn, Ni and Zn.

14. The coating liquid according to claim 13, wherein the plate-like particles of the inorganic compound are an oxide, a hydroxide, a carbonate or a sulfate.

15. The coating liquid according to claim 13, wherein the plate-like particles of the inorganic compound are alumina, gibbsite, silica, talc, kaolin, smectite or mica.

16. The coating liquid according to claim 13, wherein the coating liquid is for the electrical steel sheet that is a non-oriented electrical steel sheet.

17. The coating liquid according to claim 12, wherein the plate-like particles of the inorganic compound are an oxide, a hydroxide, a carbonate or a sulfate.

18. The coating liquid according to claim 17, wherein the plate-like particles of the inorganic compound are alumina, gibbsite, silica, talc, kaolin, smectite or mica.

19. The coating liquid according to claim 12, wherein the plate-like particles of the inorganic compound are alumina, gibbsite, silica, talc, kaolin, smectite or mica.

20. The coating liquid according to claim 12, wherein the coating liquid is for the electrical steel sheet that is a non-oriented electrical steel sheet.

* * * * *